3,471,456
POLYMERIZATION OF BETA-LACTONES
Arie Klootwijk, deceased, late of Amsterdam, Netherlands, by Johanna Maria Klootwijk, representative, and Josephus H. van Deursen, Amsterdam, Netherlands, assignors to Shell Oil Company, New York, N.Y., a corporation of Delaware
No Drawing. Filed June 2, 1967, Ser. No. 643,286
Claims priority, application Netherlands, June 23, 1966, 6608706
Int. Cl. C08g 17/017, 17/02
U.S. Cl. 260—78.3                9 Claims

ABSTRACT OF THE DISCLOSURE

The molecular weight distribution of lactones, particularly beta-lactones, is controlled by polymerizing the lactones in the presence of an anionic initiator and certain chain-transfer agents such as carboxylic acids, anhydrides or halides, phenol or thiophenol and mercaptans.

BACKGROUND OF THE INVENTION

This invention relates to a method for polymerizing lactones.

Lactones, and particularly the beta-lactones, are polymerized with the aid of suitable catalysts such as phosphines, arsines or stibines, as described in French Patent 1,419,642. The resultant polyesters, in general, possess very high molecular weights. The use of other anionic catalysts or initiators, particularly the tertiary amines, is also described in French Patent 1,231,163.

In general, the polylactones prepared with the aid of anionic initiators, exhibit molecular weights which are too high for many applications, such as, for example, for the manufacture of threads and fibers.

It has now been discovered that the molecular weight and molecular weight distribution as well as improved thermal stability is obtained when the polymerization is performed in the presence of certain compounds, herein referred to as "chain-transfer agents," and hereinafter described in greater detail.

SUMMARY OF THE INVENTION

The present invention is directed to a method for polymerizing lactones, particularly the beta-lactones. The present process permits beta-lactones to be polymerized to polyesters having a molecular weight attuned to the type of processing while favorably influencing the molecular weight distribution. The resulting polyesters also exhibit improved heat stability.

DESCRIPTION OF THE PREFERRED EMBODIMENT

The process of the instant invention is particularly directed to the polymerization or copolymerization of beta-lactones in the presence of anionic initiators wherein said polymerization is conducted in the presence of from 0.0001 to 5.0%, and preferably from 0.0005 to 0.5%, and more preferably from 0.01 to 0.2% by weight based upon the lactone, of a chain-transfer agent such as a carboxylic acid or an anhydride or acid halide thereof; a phenol or thiophenol; a mercaptan or an enolizable compound, it being understood that in the chain-transfer agent no nitro groups or halogen atoms are attached as substituents to the carbon atoms located in the alpha-position relative to the carboxyl, acid anhydride, acid halide, hydroxyl and mercapto groups.

The process of the instant invention is particularly applicable for the polymerization of beta-lactones wherein the hydrogens of the beta-propiolactones having a tertiary or quaternary alpha-carbon atom are especially preferred.

Excellent polymers are those prepared from alpha-alpha-dialkyl-beta-propiolactone wherein the alkyl groups contain from 1 to 4 carbon atoms. Suitable examples include alpha,alpha-dimethyl-beta-propiolactone, alpha - methyl-alpha-ethyl-beta-propiolactone, alpha - methyl - alpha-isopropoly-beta-propiolactone, alpha-ethyl-alpha-tert-butyl-propiolactone, alpha-alpha-diisopropyl-propiolactone, etc. Very good results were obtained in the homopolymerization of alpha-alpha-dimethyl-beta-propiolactone (pivalolactone).

Suitable anionic initiators are described in the aforesaid French patents, such as trimethylamine, triethylenediamine, tetraphenylphosphonium bromide, triphenylbutylphosphonium bromide, triphenylphosphine, betaines and the like.

The concentration of the anionic initiator in the reaction mixture may be varied over a very wide range, but as a rule it lies between 0.0001 and 1% by weight, preferably between 0.001 and 0.5% by weight, calculated on the lactone.

By selecting the quantity and type of the aforementioned chain-transfer agents the molecular weight, the molecular-weight distribution, the thermal stability and other physical properties of the polyester thus obtained can be influenced. It may also be advantageous to apply mixtures of two or more of the said chain-transfer agents.

The carboxylic acids which may be employed in the present process include, for example, formic acid, acetic acid, propionic acid, beta-chloropropionic acid, isobutyric acid, cinnamic acid, phthalic acid, benzoic acid, alpha-naphthoic acid, adipic acid, and particularly pivalic acid. Some examples of suitable anhydrides of these acids are acetic anhydride, isobutyric anhydric and phthalic anhydride. Of the acid halides the use of the acid chlorides is preferred, such as acetyl chloride, propionyl chloride and benzoyl chloride. Examples of suitable phenols, thiophenols and mercaptans are phenol, p-cresol, hydroquinone, alpha-naphthol, thiophenol, m-tolyl mercaptan, ethyl mercaptan, n-butyl mercaptan and n-nonyl mercaptan. Examples of suitable enolizable compounds are acetyl acetone and acetylacetic esters.

In these chain-transfer agents the carbon atoms located in the alpha-position relative to the carboxyl, acid anhydride, acid halide, hydroxyl and mercapto groups have no halogen atoms and nitro groups attached to them as substituents.

It has been found that compounds which do contain such a group in the alpha-position, such as alpha-chloropropionic acid, may be suitable to regulate the molecular weight, but that the resultant polyester product does not have a satisfactory thermal stability.

The temperature at which the polymerization takes place usually lies between 0 and 350° C., preferably between 20 and 280° C. The polymerization can best be conducted at atmospheric pressure, but higher or lower pressures may be advantageously employed. Higher pressures will be employed in particularly when the polymerization process is operated at high temperatures.

Although the polymerization may be carried out in the absence of a diluent, the use thereof is often desirable, since it considerably facilitates working-up of the polymer. Examples of appropriate diluents are isooctane, cyclohexane, toluene, dioxane, tetrahydrofuran and isopropyl acetate. A suitable suspension polymerization method utilizes a saturated hydrocarbon with a viscosity at the polymerization temperature of at least 7.5 cs., for example, paraffinic, medicinal or technical white oils. The weight ratio of lactone to diluent will vary as a rule between about 0.05 and 0.5, and in the case of the last-mentioned paraffinic oils preferably between 0.2 and 0.4.

It is recommended that the reaction components and reaction vessels contain as little water as possible. According to the process described in French Patent 1,341,074, the lactone can very suitably be purified by distillation after it has been heated with an isocyanate.

The instant polymerization process may be performed batchwise or continuously, for example, in a tubular reactor or in one or more reactors in which the composition of the reaction mixture is kept constant. It may be advantageous to add the chain-transfer agent continuously or in portions during the polymerization. If desired, in addition to the aforementioned components, the reaction mixture may also contain one or more additives which are inert with respect to the polymerization reaction, such as antioxidants, light stabilizers, nucleating agents, pigments and the like, which are incorporated very homogeneously in the reaction mixture in this manner.

The following examples are presented in order to illustrate the process of the invention. Unless otherwise specified, parts and percentages are given by weight.

Example I

Pivalolactone was heated together with 2% w. toluylene diisocyanate and 0.01% w. bismuth nitrate for 90 minutes at 115° C. under atmospheric pressure and subsequently isolated by distillation. Next, the purified lactone was polymerized with stirring with 0.4% by weight triphenylphosphine, calculated on lactone, in isooctane (15 parts by volume/parts by weight lactone) for 40 hours at 95° C. The conversion was virtually quantitative. The polymerization was subsequently repeated in the presence of various quantities of pivalic acid as chain-transfer agent. Next, after the resultant polymer had been mixed with 0.05% tetramethylthiuram disulphide and 0.2% trisnonylphenyl phosphite as stabilizers, its thermal stability was determined by milling at 245° C. The drop in intrinsic viscosity (IV, measured at 25° C. in trifluoroacetic acid) may be considered a measure of thermal stability. The results of these experiments are shown in Table I.

TABLE I*

|  | Pivalic acid, percent | | | | |
|---|---|---|---|---|---|
|  | 0 | 0.01 | 0.016 | 0.03 | 0.07 |
| IV (dl./g. after milling at 245° C.): | | | | | |
| After 0 minutes | 10.6(0) | 8.5(0) | 7.6(0) | 6.3(0) | 4.1(0) |
| After 2 minutes | 6.9(33) | 6.9(19) | 7.3(17) | 5.7(9) | 3.9(5) |
| After 3.5 minutes | 5.4(49) | 6.4(25) | 5.9(22) | 5.3(16) | 3.9(5) |
| After 4.5 minutes | 4.0(62) | 6.2(27) | 5.7(25) | 5.2(17) | 3.8(7) |

* The values in parentheses indicate the percentage of viscosity drop.

These data clearly show the regulating influence of the chain-transfer agent on the molecular weight of the polyester product. The data also reveal that the products obtained according to the invention have a considerably improved thermal stability. That pivalic acid as such does not possess a stabilizing action was shown in an experiment in which a stabilized mixture of polypivalolactone prepared without a chain-transfer agent and 1% pivalic acid was milled at 240° C. The IV and drop in viscosity determined were as follows: after 0 minutes 10.6 (0); after 1 minute: 8.6 (19); after 3 minutes: 5.7 (46); and after 5 minutes: 3.5 (67). This shows that mixtures of polyacetone and carboxylic acid are almost as unstable as the polylactone as such.

Example II

The procedure of Example I was substantially repeated wherein pivalolactone was polymerized with 0.02% acetic acid, benzoic acid and, for comparison, alpha-chloropropionic acid as a chain-transfer agent, and the polymerizate, after addition of the stabilizers, milled at 245° C. The results are listed in Table II.

TABLE II

| | IV after milling, dl./g. (and percentage of viscosity drop) at a milling time (minutes) of— | | | |
|---|---|---|---|---|
| | 0 | 1 | 3 | 5 |
| Chain-transfer agent: | | | | |
| Acetic acid | 6.9(0) | 6.3(9) | 5.7(17) | 5.4(22) |
| Benzoic acid | 6.9(0) | 6.3(9) | 5.7(17) | 5.4(22) |
| Alpha-chloropropionic acid | 7.2(0) | 6.4(11) | 4.9(32) | 3.3(54) |

Alcohol proved to be inactive as a chain-transfer agent.

Example III

The procedure of Example I was substantially repeated wherein pivololactone was polymerized with various quantities of phenol as a chain-transfer agent. The results obtained are tabulated in Table III.

TABLE III

| | | | | | |
|---|---|---|---|---|---|
| Phenol, percent | 0.005 | 0.01 | 0.02 | 0.05 | 0.067 |
| IV of polymer, dl./g. | 7.3 | 6.3 | 4.5 | 3.6 | 3.1 |

After stabilization, the polyester, which had been prepared with 0.02% phenol and which had an IV of 4.5, was milled at 245° C. The viscosity drop was as follows:

TABLE IV

| | | | | | |
|---|---|---|---|---|---|
| Milling time, minutes | 0 | 2 | 3.5 | 5 | 10 |
| IV, dl./g. | 4.5 | 4.1 | 4.1 | 4.2 | 4.0 |
| Viscosity drop, percent | 0 | 9 | 9 | 7 | 11 |

Example IV

The procedure of Example I was substantially repeated wherein 0.02% of various other compounds were tested for their action as a chain-transfer agent. The results are shown in Table V.

TABLE V

| Chain-transfer agent: | IV, dl./g. |
|---|---|
| Acetyl chloride | 4.2 |
| Acetyl acetone | 5.9 |
| Acetylacetic ethyl ester | 6.8 |
| Nonyl mercaptan | 5.6 |

After stabilization, the polyesters prepared with acetyl chloride and acetyl acetone were aged at 245° C. on the mill. The viscosity drop was a follows:

TABLE VI

| Polyester prepared with | Acetyl chloride | Acetyl acetone |
|---|---|---|
| IV, dl./g. (and percentage of viscosity drop) at a milling time of: | | |
| 0 minute | 4.2(0) | 5.9(0) |
| 2 minutes | 4.1(2.5) | 5.2(12) |
| 3.5 minutes | 4.1(2.5) | 4.9(17) |
| 5 minutes | 4.0(5) | 4.8(19) |

Example V

The procedure of Example I was substantially repeated wherein pivalolactone was polymerized with 0.4% triphenylphosphine and 0.05% pivalic acid, or with 0.4% triphenylphosphine and 0.02% phenol, to a polyester A with an IV of 4.8 and a polyester B with an IV of 4.5, respectively. Subsequently, the viscosity ($\eta_0$) at 260° C. of these polymers was determined in an Instron rheometer; and in both cases $\eta_0$ was $7.5 \cdot 10^4$ poises. Next the viscosity ($\eta_a$) at 260° C. and a shear stress of 1 kg./cm.$^2$ were determined. For polyester A the $\eta_0/\eta_a$ ratio amounted to 7.8; for polyester B 4.2. This shows that the use of phenol as a chain-transfer agent leads to a polyester with a narrower molecular weight distribution than the use of pivalic acid as a chain-transfer agent.

What is claimed is:

1. A process for polymerizing beta-lactones with the aid of anionic initiators which comprises polymerizing said beta-lactones in the presence of from 0.0001 to 5.0% by weight of the lactone of at least one chain-transfer agent selected from the group consisting of carboxylic acids, acid anhydrides and acid halides, phenols, thiophenols, mercaptans and enolizable compounds wherein said chain-transfer agents contain no nitro or halogen atoms attached as substituents to the carbon atoms located in the alpha-position relative to the carboxyl, acid anhydride, acid halide, hydroxyl and mercapto groups.

2. A process as in claim 1 wherein the beta-lactone is an alpha,-alpha-dialkyl-beta-propiolactone.

3. A process as in claim 1 wherein the beta-lactone is alpha,alpha-dimethyl-beta-propiolactone.

4. A process as in claim 1 wherein the chain transfer agent is pivalic acid.

5. A proces as in claim 1 wherein the chain-transfer agent is phenol.

6. A process as in claim 1 wherein the chain-transfer agent is employed in an amount from about 0.01 to 0.2% by weight based on the beta-lactone.

7. A process as in claim 1 wherein the chain-transfer agent is acetyl acetone.

8. A process as in claim 1 wherein the chain-transfer agent is acetyl chloride.

9. A process as in claim 1 wherein the chain-transfer agent is nonyl mercaptan.

References Cited

FOREIGN PATENTS

| | | |
|---|---|---|
| 775,495 | 5/1957 | Great Britain. |
| 1,128,137 | 9/1968 | Great Britain. |

WILLIAM H. SHORT, Primary Examiner

E. NIELSEN, Assistant Examiner

U.S. Cl. X.R.

260—78.3